United States Patent
Forgac et al.

(10) Patent No.: US 6,844,418 B2
(45) Date of Patent: Jan. 18, 2005

(54) WASTE PLASTIC ADDITIVE FOR ASPHALT

(75) Inventors: John M. Forgac, Elmhurst, IL (US); Ashok S. Muzumdar, Naperville, IL (US); Arun K. Singhania, Houston, TX (US); April J. Swanson, Anderson, SC (US)

(73) Assignee: BP Corporation North America Inc., Warrenville, IL (US)

( * ) Notice: Subject to any disclaimer, the term of this patent is extended or adjusted under 35 U.S.C. 154(b) by 30 days.

(21) Appl. No.: 10/390,833

(22) Filed: Mar. 18, 2003

(65) Prior Publication Data

US 2003/0195278 A1 Oct. 16, 2003

Related U.S. Application Data

(60) Provisional application No. 60/371,537, filed on Apr. 10, 2002.

(51) Int. Cl.⁷ .............................. C08F 6/00; C08L 95/00
(52) U.S. Cl. .......................... 528/481; 521/47; 524/59; 524/64; 524/71
(58) Field of Search .............................. 524/70, 59, 64; 521/47, 40.5; 528/481

(56) References Cited

U.S. PATENT DOCUMENTS

| | | | | |
|---|---|---|---|---|
| 3,562,788 A | * | 2/1971 | Weems et al. | 525/362 |
| 3,639,322 A | * | 2/1972 | Bathgate et al. | 523/307 |
| 3,852,046 A | | 12/1974 | Brown | 44/1 R |
| 4,314,921 A | | 2/1982 | Biegenzein | 260/28.5 AS |
| 5,328,943 A | * | 7/1994 | Isobe et al. | 524/70 |
| 5,702,199 A | | 12/1997 | Fishback et al. | 404/17 |
| 5,801,204 A | | 9/1998 | Johansson et al. | 521/44 |
| 6,214,908 B1 | | 4/2001 | Lem et al. | 524/59 |

FOREIGN PATENT DOCUMENTS

| | | | |
|---|---|---|---|
| DE | 4424291 | 1/1996 | C08L/95/00 |
| DE | 10037230 | 3/2002 | C08J/11/12 |

* cited by examiner

Primary Examiner—Fred Teskin
(74) Attorney, Agent, or Firm—Joseph DiSalvo

(57) ABSTRACT

The present invention provides an improved polymer additive which may be used to increase the high temperature viscosity of an asphalt, without deleteriously affecting the low-temperature viscosity of the asphalt. The polymer additive may also be used to improve the stiffness of certain asphalts. The polymer additive is produced from readily available polymer blends by a thermal process. The invention additionally provides an improved polymer modified asphalt. In its preferred embodiments, the invention also provides an environmentally acceptable method for recycle of post consumer carpet and bottles.

7 Claims, No Drawings

WASTE PLASTIC ADDITIVE FOR ASPHALT

RELATIONSHIP TO PRIOR APPLICATIONS

This application claims the benefit of provisional patent application Ser. No. 60/371,537 filed Apr. 10, 2002, entitled "Waste Plastic Additive for Asphalt." Provisional Application No. 60/371,537 is hereby incorporated by reference in its entirety.

FIELD OF THE INVENTION

This invention generally relates to asphalt used for paving and roofing purposes. More particularly, it is related to roofing and paving asphalts that are blended with liquefied plastics wherein said plastic is typically derived from scrap, consumer post-use, and mixed plastics.

BRIEF DESCRIPTION OF THE RELATED ART

Asphalt is commonly used as a roadway material due to its low material cost and ease of application. In general, maintenance is required to repair cracks and holes in the asphalt pavement, often at significant costs. This has become a major issue in recent years, especially in the USA, due to higher traffic volumes, increased loads and higher tire pressures now commonly employed in many vehicles. Clearly, improved overall performance grades of asphalt that will lead to a reduction in maintenance costs are desirable. The performance improvements, however, must be achieved in a manner that does not significantly increase the base asphalt roofing and paving economics.

Also, in recent years, plastics have experienced substantial growth and acceptance as a replacement for many materials. The growth of plastics in the bottling and packaging industry has been exceptionally steep. Plastics also continue to make up an increasingly large share of the floor coverings market. These two plastics applications, as well as others, have produced large quantities of consumer post-use and scrap plastic material. There are entire industries whose efforts are directed to finding favorable economic and ecological uses for these scrap and recycle plastic materials. This invention is directed, in part, to the use of molten scrap and recycle plastic materials as an additive which improves asphalt properties and serves to help overcome two separate broad considerations, one of which is an economic concern and the other is an ecological concern. There is substantial room for growth of this technology to expand as it is estimated that currently polymer modified asphalts represent only about three percent of the roughly 75 billion pounds of asphalt produced annually, In one sense, polymer additives may be classified as plastomers or elastomers. Plastomeric polymer additives typically have a relatively rigid three dimensional network. Asphalts containing plastomeric polymer additives generally exhibit desirable mechanical strength that serves to counteract deformation when a force is applied to these asphalts. Examples of plastomeric additives include styrene-butadiene-styrene, styrene-butadiene block copolymers, and latex rubber.

In contrast, elastomeric polymer additives can be stretched. Asphalts containing elastomeric polymer additives generally exhibit little additional mechanical strength when a force is initially applied, but these asphalts often appear to grow stronger as they are pulled out of shape. Examples of elastomeric polymeric additives include ethylene copolymers and polyethylene.

When polymer-containing asphalt is used as a pavement, both types of additives tend to mitigate rut formation. In addition, elastomeric polymer additives and polypropylene (among the plastomeric polymer additives) tend to reduce low-temperature cracking. However, many of the polymer additives which favorably increase an asphalt's high temperature viscosity actually promote low-temperature cracking by increasing the asphalt's low-temperature viscosity.

Therefore, a need exists for an improved polymer additive that increases an asphalt's high-temperature viscosity without deleteriously affecting the low-temperature viscosity. Desirably, the improved additive increase asphalt, as well. Most desirably, the improved additive is relatively inexpensive, perhaps available as a byproduct of some profitable commercial activity.

It is known in the art that a variety of plastic and polymer additives can serve to improve the level of field performance of asphalt. Another method of categorizing these plastic asphalt additive applications is by the physical state in which they are deployed. In one broad category, the plastics are deployed as solids and in the other broad category, the plastic asphalt additives are deployed as liquids. An early example directed to use of solid plastics in asphalt is found in U.S. Pat. No. 3,852,046. According to the disclosure of U.S. Pat. No. 3,852,046, thermoplastic materials are treated by grinding waste plastic products to form a particulate mixture. The particulate mixture is used as filler in an asphalt composition. Another reference, U.S. Pat. No. 5,702,199, discloses the use of granular recycled plastic to replace (or supplement) at least some of the rock aggregate component of asphalt.

A reference directed to the use of liquid plastic additive for asphalt is found in U.S. Pat. No. 5,801,204 where the waste plastic material is made at least partially fluid by mixing it with a solvent and wherein the preferred solvent is waste fats. U.S. Pat. No. 6,214,908 is directed to a synergistic blend of polypropylene, styrene butadiene rubber, and calcium carbonate wherein said blend is conveniently formed as a co-product during the de-polymerization of nylon 6 carpet. None of these references disclose the use of molten plastics as an asphalt additive.

SUMMARY OF THE INVENTION

Asphalt is an inexpensive thermoplastic and, therefore, the inclusion of costly liquidified polymer additives is economically unattractive despite the improved property gains observed. Therefore, liquid polymer additives are, as yet, not widely used in asphalt paving despite the improvements they impart in pavement properties such as crack resistance and reduced rutting. The use of less costly liquid plastic additives derived from waste, recycle, and scrap polymer and plastics sources represents a means to achieve the benefit of liquid plastic additives at commercially feasible costs. For the purposes of this application, it is convenient to consider liquefied plastics derived from waste, recycle, and scrap polymer and plastics sources generically grouped together and referred to as liquefied post-use plastics (LPP).

The present invention resides in the use of liquid plastics additives to enhance the properties of asphalt wherein the liquid plastic is derived from waste, recycle, and scrap polymer and plastics sources (LPP). The liquefaction of the plastic wastes to form LPP is carried out at temperatures of up to 600° C. and is generally deployed at LPP levels in the range of about 0.01 to about 10 weight percent of the final asphalt formulation.

DETAILED DESCRIPTION OF THE INVENTION

It should be noted that the term "comprising" is used frequently throughout the description of this invention and also in the appended claims. "Comprising", as used in this application and the appended claims is defined as "specifying the presence of stated features, integers, steps, or components as recited, but not precluding the presence or addition of one or more other steps, components, or groups thereof". Comprising is different from "consisting of", which does preclude the presence or addition of one or more other steps, components, or groups thereof.

The type of asphalt used in the asphalt-containing composition of this invention is not critical and forms no part, per se, of the invention. The asphalt can be any bituminous material such as tars, pitches or asphalts. The asphalt can be any natural or petroleum derived asphalt. A very common source of asphalt is the residue or bottoms from the petroleum refining industry which includes those asphalts commonly referred to as paving grade, roofer's flux, propane washed and air-blown.

The asphalt additive of this invention is typically prepared from predominantly solid ingredient materials such as waste plastic from carpet and bottles. As used in this application, predominantly is intended to indicate that at least 50 weight percent of the asphalt additive ingredients are solids at ambient temperature and pressure of 25° C. and one atmosphere pressure. Typically, solids will comprise about 80 weight percent of the additive ingredients and preferably solids will comprise over 90 weight percent of the additive ingredients.

The liquefaction of the asphalt additive solid ingredients is carried out in a suitable apparatus at temperatures up to 600° C. and pressures in the range of about 0.1 to about 45 atmospheres. Typically the liquefaction is conducted at temperatures between about 250° C. and 500° C. and preferably between about 300° C. and 450° C. The liquefaction may be conducted either in the absence or presence of stirring. The liquefaction is typically conducted in batch mode. A continuous process may be preferred, however, under special circumstance such as preparation of the LPP additive at or near an asphalt plant or in the preparation of asphalt additive containing concentrates which may be diluted to final usage level by mixing with additional unmodified asphalt prior to use.

The time employed for liquefaction of the LPP is not particularly critical and depends, to some extent, on economic factors such as the size of the batch needed if done by batch mode, the rate of consumption of the LPP if done in a continuous mode, and the amount of waste heat available, if any, for liquefaction. Batches are typically liquefied in times ranging from about 1 minute to about 48 hours. The preferred liquefaction time for batch operation is in the range of about 20 minutes to about 200 minutes. Continuous preparation of the LPP additive typically employs a residence time in the range of about 10 minutes to 4 hours in the liquefaction unit. While the liquefaction temperature and time are not critical, these variables cannot be entirely ignored as Applicants have found that liquefaction time and temperature affect the properties of the final LPP additive. It has been found, experimentally, that a better additive is prepared when the product of the liquefaction time in minutes and the liquefaction temperature in degrees centigrade lies within a preferred value range of about 8,000 to about 80,000.

The LPP asphalt additives of this invention appear to be indefinitely storage stable (tested for 365 days) when stored neat or as asphalt concentrate and need not be protected from oxygen (air) after cooling to ambient temperatures. Whenever practical, the LPP asphalt additives are used immediately thus reducing the energy needed to reheat and/or re-melt the LPP additive prior to blending and mixing with asphalt.

The LPP asphalt additive may be prepared from a wide variety of feed materials. The two necessary feed material limitations are as listed below.

(1) Predominantly solid polymer materials wherein predominantly is defined to mean at least 50 weight percent of the feed, and solid means the plastic exists as a solid at ambient temperature and pressure of 25° C. and one atmosphere pressure. The source of the solid plastic would typically be scrap or recycle material such as from carpet and plastic bottles.

(2) At least 5 weight percent polypropylene having a molecular weight in the range of about 1,000 to about 50,000. A preferred source of the polypropylene component is scrap or recycle polypropylene carpet.

Although the feed for the LPP additive may be substantially 100 weight percent polypropylene, other ingredients are typically present and in substantial quantity. Other feed ingredients typically present may be selected from the list below wherein said list is not to be considered exhaustive or limiting in any manner what so ever.

(3) Polyethylene and polyethylene copolymers in amounts up to as much as 95 weight percent of the feed.

(4) Any type of oil including typical refinery oil streams and virgin or recycled motor oils in amounts up to as much as 10 weight percent of the feed.

(5) Paper, cardboard, catalyst residue and non-organic materials, which may have been present in a laminated container having at least one layer of plastic, in amounts up to as much as 5 weight percent of the feed.

(6) Metal from bottle closures, label materials, catalyst residue, inorganic oxygen scavenger residue, and non-organic materials which may have been present in single layer or multi-layer plastic bottles and plastic containers in amounts up to as much as 5 weight percent of the feed.

(7) Other ambient temperature solid plastics used in packaging such as polystyrene, polyester (especially PET), polyvinyl chloride (PVC), polyamides, polyolefins, and polyvinyl alcohol.

(8) Dirt in amounts of to 5 weight percent of the feed. Dirt, in this instance, is defined as a mixture of soil, grime, dust, etc. as is typically associated with used manufactured articles, especially after outdoor or indoor storage awaiting recycle.

(9) Calcium carbonate, typically present in many carpet constructions, in amounts of up to 10 weight percent of the feed.

The liquefaction is typically conducted in a closed system and normally begins at a pressure of one atmosphere. During liquefaction in the closed system, the pressure may rise to as much as 45 atmospheres.

The liquefaction is conducted in the presence of an inert gas, such as nitrogen, which is at least 99 weight percent devoid of oxygen. The absence of oxygen ensures that any vaporization of the feed materials will not result in a potentially explosive mixture. Loss of material due to vaporization during liquefaction is substantial and typically about 10 to about 20 weight percent of the feed is lost to vaporization during the liquefaction process. These vapors may be recovered from the nitrogen by known methods. The recovered vapors may be recycled to the feed or used as part of the feed in subsequent batches or runs for preparation of the asphalt additive. In some instances, a pump may be used for stirring during the liquefaction and for removal of the liquefied additive product. When a pump is used for stirring, it is convenient to include at least some oil as part of the feed. The presence of oil in the feed assures immediate stirring by the pump. Otherwise, there will be no effective stirring by the pump until some liquefaction of the feed has occurred.

Additive Composition Examples

Table 1 lists the formulations and other data for 13 batches of LPP additive that were prepared as part of over 1000 formulations tested. The source of the plastics used for some of the formulations was the Rutgers' Center for Plastics Recycling. Another plastics source for some of the formulations was from the American Plastics Council (APC) at Texaco's Laboratory in Montebello, Calif. All 13 batches listed in Table 1 were prepared in the absence of any added catalyst. All values designating the amount of each feed component for the LPP are expressed in terms of weight percent of that component with respect to total weight of the LPP additive feed. Liq. Temp. is the temperature in ° C. at which the feed was liquefied. Liq. Time is the liquefaction time in minutes. Melting point is the melting point of the LPP formulation in ° C. The thirteen batches in Table 1 were prepared via a stirred batch process under a nitrogen blanket. The feed component listed as other, when applicable, was a mixture of dirt, calcium carbonate, aluminum and other metals, and paper/cardboard in approximately equal weight percentages.

For all of the above examples, the melting point for each was determined as recited below. A small amount of sample material was placed on a heated stage microscope. The temperature was gradually increased. When small lumps of the material melted, the temperature reading was taken. Melting was defined to occur when a ball of liquid appeared. The procedure used a completely liquefied droplet as the determining melting event. Applicants have determined experimentally that asphalt additive formulations having a melting point in the range of about 100° C. to about 170° C. are preferred because they blend easily with asphalt.

1. About 0.1 to about 2 percent of the methyl groups present in the polymer additive are terminally disposed on a relatively long carbon chain (polymer backbone).
2. About 20 to about 80 percent of the carbon to carbon double bonds present are disposed medially on a relatively short carbon chain.

It was found, experimentally, by Applicants that samples having the values of these NMR elucidated attributes in the ranges specified tended to outperform samples tested which had values outside of the ranges recited above.

Asphalt Composition Examples

It is customary to characterize (classify) asphalt grade by a given set of specifications required in order to achieve a given grade level as opposed to characterization by composition. In fact, composition of the asphalt is largely ignored in determining the asphalt grade. For further understanding, it is useful to consider an asphalt binder classified as a PG 58-28 grade. The PG refers to "performance grade". The 58 refers to the probable high pavement temperature, 58° C. (136° F.), expected for the life of the construction project. The −28 refers to the probable low pavement temperature, −28° C. (−18° F.), expected for the life of the construction project. The asphalt specifications required for a given construction project are typically stated as listed below.

| | |
|---|---|
| DSR | 1 MIN |
| RTFOT % LOSS | 1.00 MAX |
| RTFOT DSR 64 | 2.20 MIN |
| PAV DSR 22 | 5000 MAX |
| BBR S-18 | 300 MAX |
| BBR M-18 | 0.300 MIN |

In the above specification, DSR means Dynamic Shear Rheometer and represents a measurement or indication of viscosity. RTFOT means rolling thin film oven test and is a measurement of the ability of asphalt to resist rut formation. PAV means Pressure Aging Vessel. BBR means Bending Beam Rheometer and is a measure of the ability of asphalt to resist deformation.

The method used to ascertain the advantages of using the LPP asphalt additives of this invention measuring the prop-

TABLE 1

Composition of 13 LPP Additives

| | LPP Formulation | | | | | | | | | | | | |
|---|---|---|---|---|---|---|---|---|---|---|---|---|---|
| | 168 | 178 | 184 | 188 | 172 | 1368 | 171 | 196 | 175 | 170 | 178 | 190 | 0164 |
| Polypropylene | 7 | 12 | 12 | 12 | 12 | 7 | 7 | 7 | 9 | 7 | 8 | 7 | 100 |
| Polyethylene | 70 | 60 | 60 | 60 | 60 | 70 | 80 | 70 | 80 | 70 | 71 | 70 | 0 |
| Polystyrene | 9 | 16 | 16 | 16 | 16 | 9 | 3 | 9 | 3 | 9 | 9 | 9 | 0 |
| PVC | 5 | 6 | 6 | 6 | 6 | 5 | 3 | 5 | 3 | 5 | 5 | 2 | 0 |
| PET | 2 | 6 | 6 | 6 | 6 | 2 | 7 | 2 | 5 | 2 | 0 | 5 | 0 |
| Polybutene | 7 | 0 | 0 | 0 | 0 | 0 | 0 | 0 | 0 | 0 | 0 | 0 | 0 |
| 10W-30 Motor Oil | 0 | 0 | 0 | 0 | 0 | 0 | 0 | 0 | 0 | 7 | 7 | 7 | 0 |
| Other | 0 | 0 | 0 | 0 | 0 | 7 | 0 | 7 | 0 | 0 | 0 | 0 | 0 |
| Liq. Temp., ° C. | 391 | 360 | 360 | 360 | 360 | 405 | 391 | 391 | 391 | 391 | 350 | 404 | 300 |
| Liq. Time, Min. | 30 | 180 | 180 | 120 | 120 | 30 | 30 | 30 | 30 | 30 | 120 | 30 | 60 |
| Melting Point, ° C. | 124 | 114 | 114 | 117 | 117 | 109 | 130 | 124 | 130 | 123 | 125 | 109 | 140 |

Many of the formulations, including all the examples from Table 1 above, were submitted to $C^{13}$ NMR analysis. On average, the following NMR characterizations may be made regarding the additives that produce superior results.

erties of an unmodified (i.e., no LPP additive) base asphalt, especially one that did not meet the above specifications. Then some of the LPP additive of this invention was mixed with the base asphalt so as to comprise 2 weight percent of the final asphalt binder formulation. Finally, the properties of the modified asphalt were measured. If the properties of the modified asphalt were improved, then the LPP additive was considered to be beneficial. If the properties of the modified asphalt improved, but not enough to meet the above specifications, then the amount of additive needed to bring the base asphalt up to the specification values was calculated. In those instances where addition of 2 weight percent exceeded the specification values, then the amount needed would show how much excess additive was present. After upgrading the specifications of the base asphalt with LPP additive, the modified asphalt could be sold for use in instances that required the above specifications. Stated otherwise, an under qualified asphalt could be transformed into a qualified asphalt by addition of the LPP additives of this invention. The results for some additive formulations are summarized in Table 2 below.

TABLE 2

Asphalt Mixed With LPP Additive

|  | Spec. Limits | Base Asphalt | LPP 0164 | LPP 0168 | LPP 0172 | LPP 0175 | LPP 0178 | LPP 0181 | LPP 0184 | LPP 1368 |
|---|---|---|---|---|---|---|---|---|---|---|
| Weight % LPP | N/A | 0 | 2 | 2 | 2 | 2 | 2 | 2 | 2 | 2 |
| Base Asphalt | N/A | PG 58-28 | PG 58-28 | PG 58-28 | PG 58-28 | PG 58-28 | PG 58-28 | PG 58-28 | PG 58-28 | PG 58-28 |
| Original DSR | 1 MIN | 0.51 | 1.15 | 0.84 | 1.38 | 0.925 | 1.103 | 0.94 | 0.872 | 0.983 |
| RTFOT % Loss | 1.00 MAX | 0.33 | 0.3 | 0.33 | 0.325 | 0.345 | 0.345 | 0.315 | 0.33 | 0.31 |
| RTFOT DSR 64 | 2.20 MIN | 0.67 | 2.37 | 2.09 | 2.37 | 2.08 | 2.51 | 2.08 | 2.06 | 1.84 |
| PAV DSR 22 | 5000 MAX | 2780 | 2370 | 2843 | 3762 | 2833 | 2836 | 2306 | 2913 | 2940 |
| BBR S-18 | 300 MAX | 201.5 | 202 | 196 | 194.5 | 209 | 225 | 212.5 | 186 | 217 |
| BBR M-18 | 0.300 MIN | 0.319 | 0.321 | 0.3165 | 0.319 | 0.3185 | 0.3125 | 0.3195 | 0.32 | 0.32 |
| Wt % Needed | N/A | N/A | 1.9 | 3 | 2 | 2.6 | 1.9 | 2.5 | 2.8 | 2.8 |

Generally the LPP additive is mixed while stirring with the molten base asphalt. It may be preferable to mix the LPP additive with the binder asphalt composition prior to final formulation with the aggregate material, especially for the preparation of concentrates that will subsequently be diluted, before use, by addition of more asphalt. Use of a shear mix blender is not required. If a shear mix blender is used for blending the additive into the asphalt, special precaution should be taken (such as feeding both asphalt and additive at the same time) to prevent separation during introduction to the shear mix blender.

Reasonable variation and modification are possible in the scope of the foregoing disclosure and the appended claims to this invention, the essence of which is that an asphalt additive prepared predominantly from liquefied polymer scrap and liquefied recycled polymer articles of manufacture serves to improve the properties of asphalt compared to the properties of asphalt having no such additive.

We claim:

1. A process for manufacturing a polymer additive, useful for improving the properties of an asphalt, comprising the steps of:

(a) providing a predominantly solid polymer feedstock comprising at least 5 weight percent polypropylene having a molecular weight in the range of about 1,000 to about 50,000; and (b) thermally, treating the polymer feedstock in the presence of an inert gas purge, which is substantially oxygen free, at a pressure of about 0.1 to about 45 atmospheres and a temperature in the range of about 250° C. to about 600° C. for a time period in the range of about 1 minute to about 48 hours to produce the polymer additive.

2. The process of claim 1 wherein about 0.1 to about 2 percent of the methyl groups present in the polymer additive are terminally disposed on a relatively long carbon chain.

3. The process of claim 1 wherein about 20 to about 80 percent of the carbon to carbon double bonds present in the polymer additive are disposed medially on a relatively short carbon chain.

4. The process of claim 1 wherein the polymer additive feedstock also comprises polyethylene.

5. The process of claim 1 wherein the polymer additive feedstock is substantially composed of post-use plastic material.

6. A process for manufacturing an improved asphalt composition, useful for paving roads and sealing roofs, comprising the steps of:

(a) providing a predominantly solid polymer feedstock comprising at least 5 weight percent polypropylene having a molecular weight in the range of about 1,000 to about 50,000;

(b) thermally treating the polymer feedstock, in the presence of an inert gas purge which is substantially oxygen free, at a pressure of about 0.1 to about 45 atmospheres and a temperature in the range of about 250° C. to about 600° C. for a time period in the range of about 1 minute to about 48 hours to produce a polymer additive; and (c) adding the product obtained in Step (b) above to asphalt so as to comprise from about 0.01 to about 10.0 weight percent of the final asphalt composition.

7. The process of claim 6 wherein the asphalt is derived from at least one product of petroleum refining.

* * * * *